(12) United States Patent
Mehrseresht

(10) Patent No.: US 10,445,582 B2
(45) Date of Patent: Oct. 15, 2019

(54) TREE STRUCTURED CRF WITH UNARY POTENTIAL FUNCTION USING ACTION UNIT FEATURES OF OTHER SEGMENTS AS CONTEXT FEATURE

(71) Applicant: CANON KABUSHIKI KAISHA, Tokyo (JP)

(72) Inventor: Nagita Mehrseresht, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 15/385,291

(22) Filed: Dec. 20, 2016

(65) Prior Publication Data

US 2018/0173955 A1    Jun. 21, 2018

(51) Int. Cl.
  *G06K 9/00* (2006.01)
  *G06K 9/62* (2006.01)
  *G06K 9/46* (2006.01)

(52) U.S. Cl.
  CPC ..... *G06K 9/00718* (2013.01); *G06K 9/00765* (2013.01); *G06K 9/4671* (2013.01); *G06K 9/6247* (2013.01); *G06K 9/6272* (2013.01); *G06K 9/6278* (2013.01); *G06K 9/6297* (2013.01); *G06K 9/00744* (2013.01); *G06K 9/6269* (2013.01)

(58) Field of Classification Search
  None
  See application file for complete search history.

(56) References Cited

U.S. PATENT DOCUMENTS

| 2008/0112625 | A1 | 5/2008 | Cooper | |
| 2009/0316988 | A1* | 12/2009 | Xu | G06K 9/6256 382/173 |
| 2010/0027845 | A1* | 2/2010 | Kim | G06K 9/00355 382/107 |
| 2012/0219186 | A1 | 8/2012 | Wang et al. | |
| 2012/0314064 | A1 | 12/2012 | Liu et al. | |

(Continued)

OTHER PUBLICATIONS

Tang, Kevin, Li Fei-Fei, and Daphne Koller. "Learning latent temporal structure for complex event detection." 2012 IEEE Conference on Computer Vision and Pattern Recognition. IEEE, 2012. 10 pages (Year: 2012).*

(Continued)

*Primary Examiner* — Ryan P Potts
(74) *Attorney, Agent, or Firm* — Canon U.S.A., Inc. IP Division

(57) ABSTRACT

A method of determining a composite action from a video clip, using a conditional random field (CRF), the method includes determining a plurality of features from the video clip, each of the features having a corresponding temporal segment from the video clip. The method may continue by determining, for each of the temporal segments corresponding to one of the features, an initial estimate of an action unit label from a corresponding unary potential function, the corresponding unary potential function having as ordered input the plurality of features from a current temporal segment and at least one other of the temporal segments. The method may further include determining the composite action by jointly optimizing the initial estimate of the action unit labels.

9 Claims, 8 Drawing Sheets

(56) References Cited

U.S. PATENT DOCUMENTS

2016/0063358 A1 3/2016 Mehrseresht
2016/0071024 A1 3/2016 Amer et al.

OTHER PUBLICATIONS

Lan, Tian, et al. "Discriminative latent models for recognizing contextual group activities." IEEE Transactions on Pattern Analysis and Machine Intelligence 34.8 (2012): 1549-1562. 14 pages (Year: 2012).*

Kuehne, Hilde, Ali Arslan, and Thomas Serre. "The language of actions: Recovering the syntax and semantics of goal-directed human activities." Proceedings of the IEEE conference on computer vision and pattern recognition. 2014. 8 pages (Year: 2014).*

Izadinia, Hamid, and Mubarak Shah. "Recognizing complex events using large margin joint low-level event model." European Conference on Computer Vision. Springer, Berlin, Heidelberg, 2012. 16 pages (Year: 2012).*

Koppula, Hema, and Ashutosh Saxena. "Learning spatio-temporal structure from rgb-d videos for human activity detection and anticipation." International Conference on Machine Learning. 2013. 9 pages (Year: 2013).*

Tang, Jie, et al. "Tree-structured conditional random fields for semantic annotation." international semantic web conference. Springer, Berlin, Heidelberg, 2006. 15 pages (Year: 2006).*

Oneata, Dan, Jakob Verbeek, and Cordelia Schmid. "Action and event recognition with fisher vectors on a compact feature set." Proceedings of the IEEE international conference on computer vision. 2013. 8 pages (Year: 2013).*

Elkan, Charles. "Log-linear models and conditional random fields." Tutorial notes at CIKM'08 (2008). 27 pages (Year: 2008).*

Kuehne, et al., "The Language of Actions: Recovering the Syntax and Semantics of Goal-Directed Human Activities", Proceedings from CVPR, 2014.

Chatzis, et al., "The Infinite-Order Conditional Random Field Model for Sequential Data Modeling", IEEE Transactions on Pattern Analysis and Machine Intelligence, vol. 35, No. 6, Jun. 2013.

* cited by examiner

TREE STRUCTURED CRF WITH UNARY POTENTIAL FUNCTION USING ACTION UNIT FEATURES OF OTHER SEGMENTS AS CONTEXT FEATURE

TECHNICAL FIELD

The present invention generally relates to an imaging system and method for classifying an action in video.

BACKGROUND

Classification (also called categorisation) is the task of assigning an input to a certain group (also called class or category). The output of classification is the label of the group that the input has been assigned to. The assignment of an input to a class is generally based on certain characteristics of the input which are called features. When classes are formed based on some ontology, the classification provides semantic understanding. Semantic classes are often arranged into a hierarchical structure. For example, a taxonomy is a set of classes arranged in a tree structure.

In one approach to a classification, a label of each test instance (e.g., a video or a segment of a video) is determined independently of labels of all other test instances. However, such an approach fails to exploit logical or statistical interdependencies between labels of multiple instances, resulting in reduced classification accuracy. Classification approaches that exploit logical or statistical interdependencies are called joint classifications. Structured classification is another term commonly used for joint classification.

In machine learning, a probabilistic classifier is a classifier that is able to provide, given a sample input, a probability distribution over a set of predicted classes. Probabilistic classifiers represent a classification task as a random variable (e.g., Y) and the result of a classification process (i.e., the label inferred for a test instance) is the value of the random variable; e.g. Y=y means the outcome of classification, modelled as Y, is the state (i.e., label) y. A probabilistic classifier may be considered as a conditional distribution $P(Y|x)$, meaning that for a given input $x \in X$, a probability is assigned to each $y \in Y$. A classification method may use a probabilistic classifier to determine a classification by choosing the label, y, which the probabilistic classifier assigns the highest conditional probability. This is known as the maximum a posteriori (MAP) solution to the joint probabilistic model. The MAP solution to a probabilistic model is a state (y*) that maximises the posterior probability distribution $(Y|x)$; i.e., $y^* = \mathrm{argmax}_y \, P(Y=y|x)$. The variable x is often called observed variable or feature.

In one approach, probabilistic joint classification is performed using a probabilistic graphical model. A probabilistic graphical model is a probabilistic model for which a graph expresses the conditional interdependencies between random variables. A probabilistic graphical model breaks up the joint probability distribution into smaller factors, each over a subset of random variables. The overall joint distribution is then defined as the normalised product of these factors. The function modelling the dependencies between the random variables in a factor is called potential function.

Types of probabilistic graphical models include Bayesian networks and Markov networks, also called Markov Random fields (MRF). An MRF conditioned on the value of observed variables is called a conditional Markov random field (CRF). The distinction between CRF models and MRF models is that a CRF model is conditioned on an input observed variable while an MRF is not. Once all input observed variables of a CRF model are accounted for, the CRF model is an MRF model. For that reason, this disclosure makes no distinction between a CRF model and an MRF model. Thus any use of the term MRF is understood to mean CRF or MRF.

An MRF consists of an undirected graph in which the nodes represent random variables, and the edges represent factors or potential functions over a pair of variables. A potential function including any number of observed variables and only one non-observed (i.e., output) variable is called unary potential function. A potential function including two output variables is called a pair-wise potential function. A pair-wise potential function may also be called a binary potential function. A potential function (i.e., factor) including more than two variables is often called a high order clique. An MRF is a tree-structured MRF when the dependency modelled in the probability distribution can be shown with a tree structure graph. In graph theory, a tree is an undirected graph in which any two vertices are connected by exactly one path.

Any MRF with positive potential functions can be converted into a log-linear representation in which the potential functions are represented as exponential of linear combination of feature functions. Each feature, similar to factors, has a scope. Different features can have the same scope.

To construct an MRF model, the number of random variables and the corresponding observed feature values must be known prior to the use of the MRF model. MRF models capture interdependencies between labels of multiple instances, but the interdependences are undirected (e.g., non-causal). For example, in computer vision, MRF models are used in object detection to capture correlation between labels of objects in an image.

Known methods do not teach how to construct a probabilistic model so that the model may be used to, efficiently and accurately, jointly infer classifications for a composite action (also known as complex action) and the sequence of its constituent primitive actions (also known as action units). Known methods fail to exploit the dependencies between the different time scales to achieve accurate classification.

One approach is to model sequential data using a CRF model. A sequence memorizer is used for modelling long term dependencies as the transition potentials. This approach performs an approximate inference only, and this approach does not model dependencies at different scales. This modelling approach may lead to lower accuracy as it disregards interdependencies between classifications at different time scales.

Another approach is to model composite actions as temporally structured processes using a combination of context free grammar (CFG) and Hidden Markov Models (HMM). The HMMs are used to classify action units. Context free grammar is used to recognise the class of the composite action from detected action units. This modelling approach requires all possible compositions of action units into composite actions to be defined a priori. The lack of robustness to changes in the actions results in lower classification accuracy.

Thus, there exists a need for accurate classification of composite actions and action units in a video which is robust to different time scales and which is robust to changes in the composition of action units, while enabling efficient and accurate inference.

SUMMARY

Disclosed are arrangements which seek to address at least one of the above problems by classifying action units of a composite action using the action units of current and previous segments.

In accordance with an aspect of the present disclosure, there is provided a method of determining a composite action from a video clip, using a conditional random field (CRF), the method comprising: determining a plurality of features from the video clip, each of the features having a corresponding temporal segment from the video clip; determining, for each of the temporal segments corresponding to one of the features, an initial estimate of an action unit label from a corresponding unary potential function, the corresponding unary potential function having as ordered input the plurality of features from a current temporal segment and at least one other of the temporal segments; and determining the composite action by jointly optimising the initial estimate of the action unit labels.

BRIEF DESCRIPTION OF THE DRAWINGS

At least one embodiment of the invention will now be described with reference to the following drawings, in which.

DETAILED DESCRIPTION INCLUDING BEST MODE

Context

Figure 1:
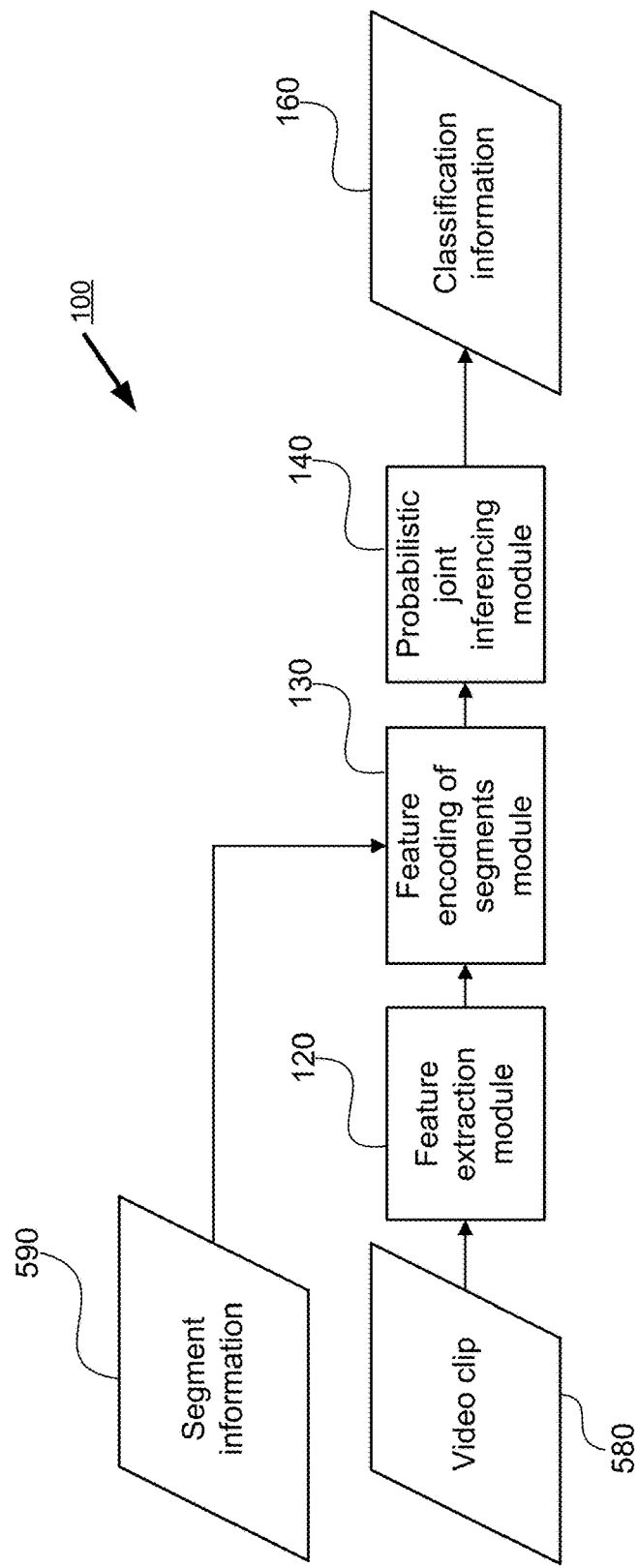
FIG. 1 is a schematic block diagram of a data processing architecture according to an embodiment of the invention.

A video clip 580 (see FIG. 5) comprises actions performed by an actor, e.g. a cook, observed over time. Some actions are performed on an object, e.g. on a loaf of bread. A composite action 570 (also known as a complex action for the purpose of this disclosure) is an act which is composed of multiple single acts, also known as primitive actions or action units 530. An example of a composite action 570 is "making a sandwich", and examples of its constituent action units 530 are "slicing bread", "buttering bread", "adding bacon", "adding lettuce", "adding tomato", "toasting", and the like.

Action units 530 can change without changing the composite action 570. For example, the order can change by switching the action units of "adding tomato" and "adding lettuce", without changing the composite action 570. In another example, leaving the tomato out (i.e., the action unit of "adding tomato" is not performed) still results in the composite action of "making a sandwich."

In addition, in between the start and the end of the composite action 570, actions unrelated to the composite action 570 may occur. For example, the person making the sandwich may perform an unrelated action unit of taking a phone call. The characteristics of this type of problem are well modelled by a Conditional Random Field (CRF).

The states of the constituent action units and the composite action are related. For example, an action unit of "adding tomato" is likely to be related to the composite actions of "making a sandwich" or "making an omelette", but the action unit of "adding tomato" is unlikely to be related to the composite action "making tea". Similarly, when the composite action of "making tea" is expected, the action unit of "adding tomato" is unlikely to occur. Hence, there is an advantage to modelling the interdependency of the states of the composite action and the constituent action units to achieve a higher classification accuracy compared to modelling the action units and composite actions independently.

In addition, when modelling interdependencies there is an advantage to using the temporal ordering of action units as the consecutive action units are often related. For example, an action unit of "adding tomato" is likely to be before or after an action unit of "adding lettuce" or "adding bacon", but an action unit of "adding tomato" is less likely to happen after an action unit of "pour coffee". Even inexperienced cooks are likely to perform a "crack egg" action unit before a "fry egg" action unit. Accommodating the temporal ordering in modelling increases overall classification accuracy. Thus, there is an advantage to modelling the interdependencies of the states of consecutive action units. However, modelling of interdependencies is limited by the practicality of solving the interdependency problem, as modelling all interdependencies would result in an extremely large state space problem. For example, for a classification problem with 10 composite actions and a few constituent action unit segments (where, for example, each segment has 50 possible action units states), modelling all interdependencies would result in such a large state spaces problem, which would be impractical to do inferencing by exhaustively searching over all the states.

Instead of directly modelling temporal ordering of action units, the embodiments described in present disclosure use context features from temporal segments of multiple action units to efficiently infer the joint states of composite actions and its constituent action units.

The present disclosure relates to rich semantic understanding of composite actions and action units in videos, and in particular efficient joint recognition and classification of these actions.

For the purpose of this disclosure the following terms are defined:

the term 'segment', 'video segment' or 'temporal segment' is used to refer to the whole or part of a video clip of an event or scene. A video clip includes a set of images with temporal ordering. (An image is also known as a frame or a video frame for the purpose of this disclosure.)

The term 'clip' 580 or 'video clip' is used to refer to a video segment which comprises a composite action.

The term 'classification information' refers to information of an object or action class label.

The term 'action', without further qualification, refers to both composite actions and action units.

For the purpose of this disclosure, a potential function is a log-linear potential function unless stated otherwise.

In one example, the described arrangements are used to analyse and semantically tag a video in an archive, for example in a video retrieval system. In another example, a live video feed is analysed and semantically tagged with a delay of a few seconds. Such a tagging may issue an alert to an operator when an action of interest is observed in the video feed.

Overview of the Invention

Where reference is made in any one or more of the accompanying drawings to steps and/or features, which have the same reference numerals, those steps and/or features have for the purposes of this description the same function(s) or operation(s), unless the contrary intention appears.

Structural Context

Figure 2A:
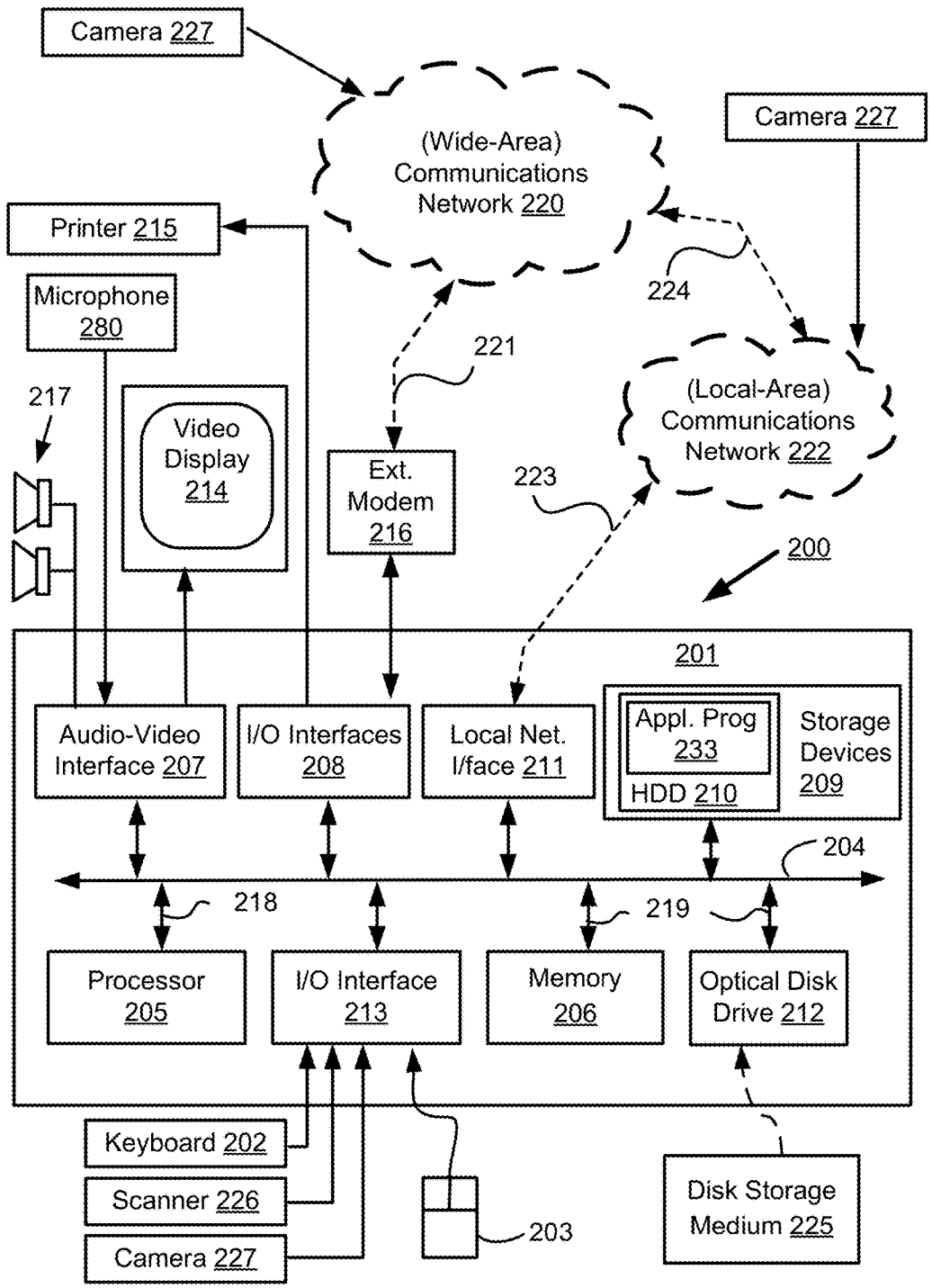
FIGS. 2A and 2B are schematic block diagrams of a general purpose computer on which the embodiments of the invention may be practised.
Figure 2B:
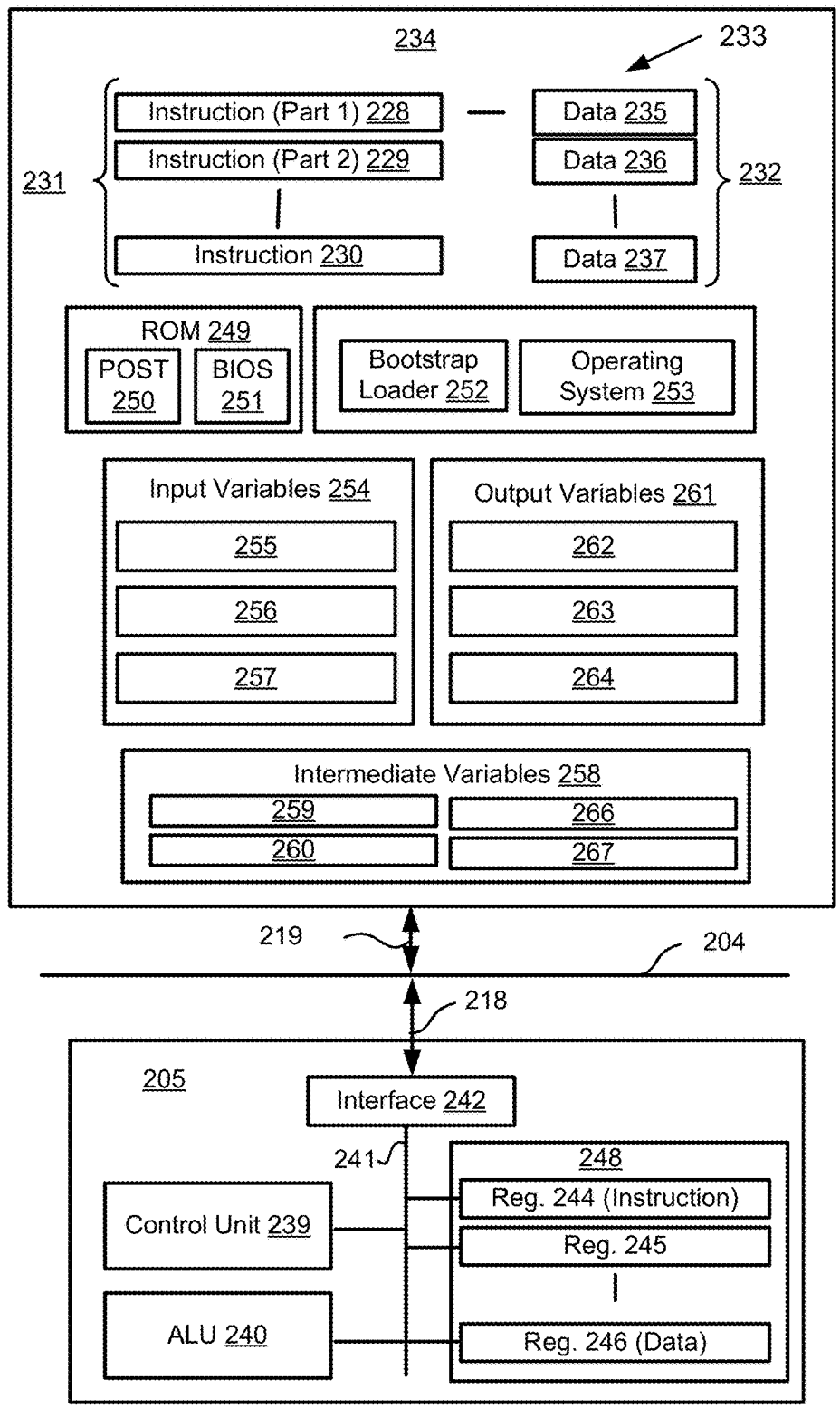

FIGS. 2A and 2B depict a general-purpose computer system 200, upon which the various arrangements described can be practised.

As seen in FIG. 2A, the computer system 200 includes: a computer module 201; input devices such as a keyboard 202, a mouse pointer device 203, a scanner 226, a camera 227, and a microphone 280; and output devices including a display device 214, a printer 215 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and the printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

In some implementations, the camera 227 may be connected to the computer module 201 via the communications network 220 or the local-area communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or like computer systems.

The method of joint action classification may be implemented using the computer system 200 wherein the processes of FIGS. 1 and 3 to 7, to be described, may be implemented as one or more software application programs 233 executable within the computer system 200. In particular, the steps of the method of joint action classification are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the joint action classification methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for joint action classification.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 200 preferably effects an apparatus for joint action classification.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed joint action classification arrangements use input variables 254, which are stored in the memory 234 in corresponding memory locations 255, 256, 257. The joint action classification arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 1 and 3 to 7 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The method of joint action classification may alternatively be implemented in the camera 227. Such a camera 227 may include graphic processors, digital signal processors, or one or more microprocessors and associated memories.

FIG. 1 is a schematic block diagram of code modules of a composite action recognition system 100 stored within the computer system 200. The code modules are stored within the storage device 209 and are implemented as one or more software application programs 233 executable within the computer system 200.

The recognition system 100 receives a video clip 580, which may be provided to the computer system 200 by the camera 227 (via the I/O Interface 213, the communications network 220, or the local-area communications network 222) or another computer system (via the communications network 220 or the local-area communications network 222). The video clip 580 comprises one or more composite actions, where each composite action is constituted from a plurality of segments 590a to 590n (see FIG. 5), where each of the segments 590a to 590n comprises an action unit.

The video clip 580 is then processed by a feature extraction module 120 such as Space-Time Interest Points (STIP) to generate features from frames of the video clip 580. A feature encoding module 130 then combines the features from the extraction module 120 with segment information 590a to 590n to produce a feature relating to segments 590a to 590n of the video clip 580. The segment based feature information from the feature encoding module 130 are processed by a probabilistic joint inferencing module 140, as will be described below in more detail in relation to FIGS. 3 and 5, to produce classification information 160 (which are items 530a to 530n and 570 in FIG. 5) (e.g., rich tags) from the video clip 580.

The classification information of item 550 relates to a classification of a composite action of the video clip 580, while the classification information of items 510a to 510n relate to classification of action unit items 530a to 530n of the composite action of the video clip 580.

Figure 3:
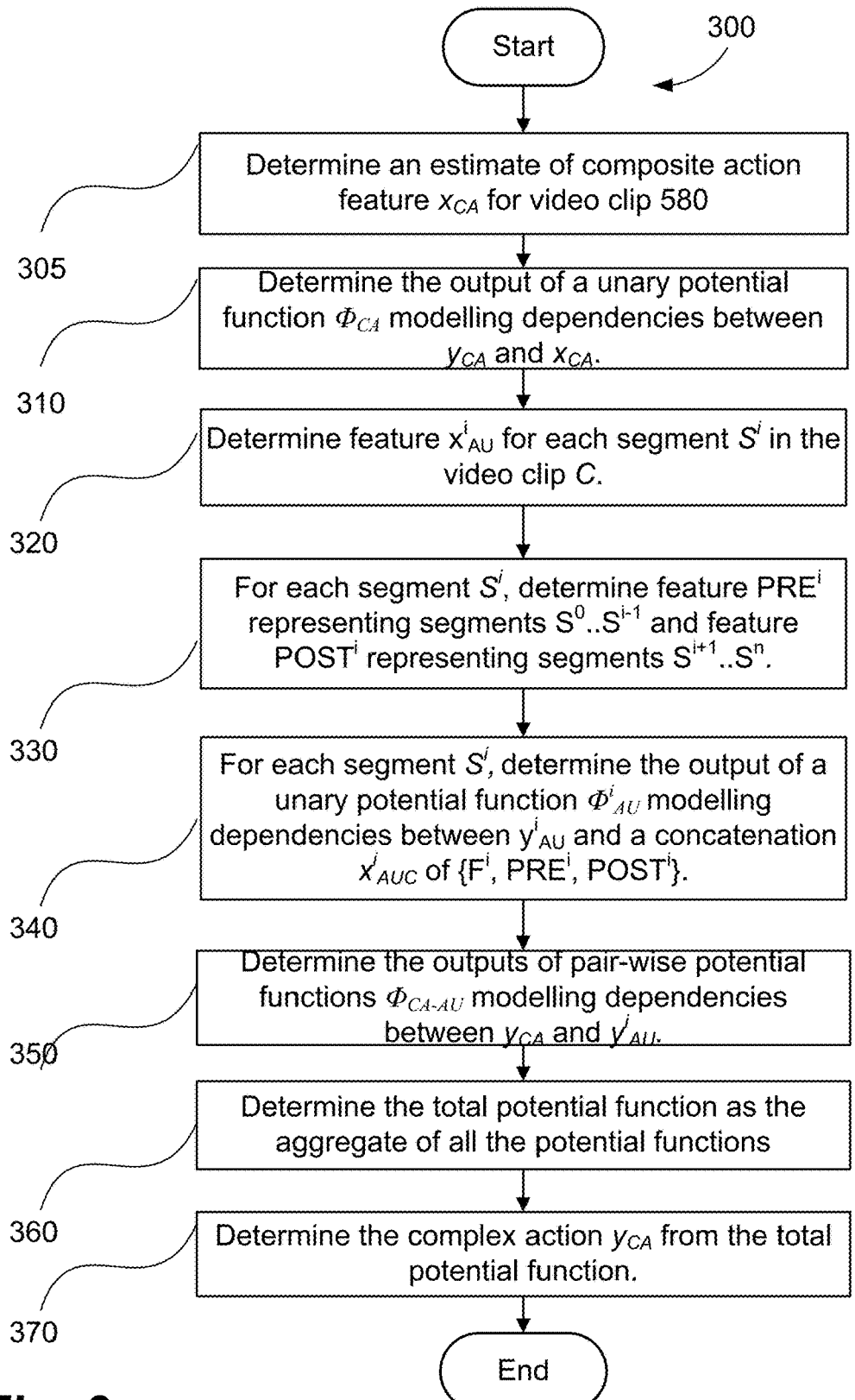
FIG. 3 is a schematic flow diagram illustrating a method of joint action classification with context features according to one embodiment of the invention.
Figure 5:
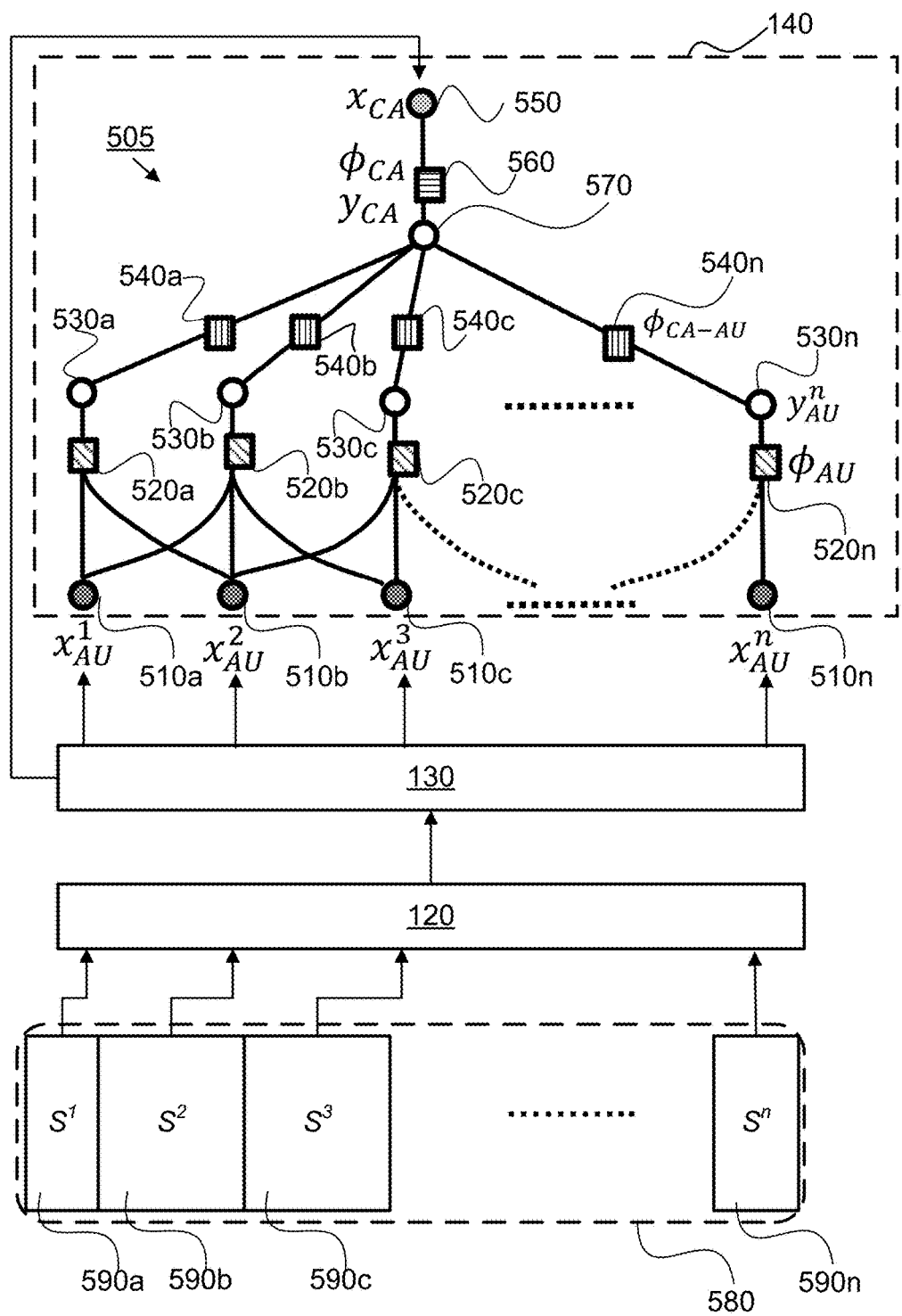
FIG. 5 is a visualisation of a graphical model of FIG. 3.

FIG. 3 is a schematic flow diagram of a method 300 to perform joint action classification. FIG. 3 will be described in conjunction with FIG. 5, which is a visualisation of a graphical model of FIG. 3. In particular, the probabilistic joint inferencing module 140 is represented as a tree structured contextual CRF model. In FIG. 5, input variables represented as x and output variables represented by y are represented as circular shapes (510, 530, 550, 570), and potential functions (D are represented as squares (520, 540, 560) joining lines (also known as arcs, or edges) of various random variables x and y.

The method 300 is implemented as one or more software application programs 233, which are executable within the computer system 200.

The method 300 requires the video clip 580 to have been segmented into segments $S^1$ to $S^n$ (590a to 590n) prior to the execution of the method 300, where each segment (590a to 590n) corresponds to an action unit of interest or a part of the video clip 580 where no action unit of interest takes place. A segment (i.e., one of 590a to 590n) is said to have no action unit of interest when none of the actions from a predetermined list happen during the segment 55.

Such a segment is also known as idle or silence. Examples of an idle action unit are "taking a phone call" or "waiting for water to boil" during food preparation, or when no person is present to perform an action unit. The total number of segments 590a to 590n associated with the clip 580 is represented as n. The steps shown in method 300 can be executed in a variety of orders, and some steps can be executed in parallel.

The segments 590a to 590n are collectively referred to as the segments 590 hereinafter, and, when referring to one of the segments 590, the segment 590 is used.

The joint action classification method 300 starts with composite action feature determination step 305. The step 305 determines an estimate of the composite action feature $x_{CA}$ 550 (see FIG. 5), also known as an initial classification or pre-classification of the composite action in video clip 580. The estimate of the composite action feature $x_{CA}$ 550 is determined, by the feature extraction module 120 and the feature encoding of segments module 130, from the video clip 580 (as shown in FIG. 5). Step 305 is an optional step of the method 300.

In one embodiment, the feature extraction module 120 uses a sparse STIP feature extraction to generate features from frames of the video clip 5805. The feature extraction module 120 then outputs HOG-HOF (histogram of oriented gradient—histogram of optical flow) descriptors. Alternatively, when sufficient computational resources are available, the feature extraction module 120 computes "dense trajectories" to generate features from frames of the video clip 580.

The feature encoding of segments module 130 receives the HOG-HOF descriptors and uses Fisher vector encoding to pool the features extracted for all the frames in the segment (i.e., whole video clip 580). Fisher vectors encode both first and second order distance statistics between the feature descriptors (i.e., HOG-HOF descriptors) and a Gaussian Mixture Model (GMM). The GMM has been trained in a composite action feature learning module 440 (which will be described hereinafter with reference to FIG. 4) to a random sub-set of HOG-HOF descriptors from the training data set 410.

In one alternative embodiment of the feature encoding of segments module 130, the number of HOG-HOF descriptors assigned to each Gaussian component, say 64 components, is also recorded in the Fisher vectors. The feature encoding of segments module 130 first applies Principal Component Analysis (PCA) to reduce the dimension of the video clip 580 features, say from 162 dimensions to 80 dimensions, and to decorrelate the data, before calculating the Fisher vector encoding. Thus, when PCA is applied each Fisher vector has 2×80×64=10240 dimensions. In the alternative embodiment, the feature encoding of segments module 130 uses the same GMM model to pool over the whole video clip 580. Applying PCA before calculating Fisher vector encoding is an optional step.

In one arrangement, the video clip 580 is split into smaller segments 590a to 590n arbitrarily to preserve temporal characteristics that may be lost when the feature encoding of segments module 130 pools over the whole video clip 580. For example, the video clip 580 is split into 4 segments 590a to 590d of the same length, and a Fisher vector encoding is made for each segment 590a to 590d, by pooling HOG-HOF descriptors in each 590a to 590d. The 4 Fisher vector encodings are then concatenated into a single vector for the video clip 580.

In one alternative embodiment, a multi-class support vector machine (SVM) is used after the feature encoding of segments module 130. The SVM classifies the Fisher vector encodings to obtain a value for the composite action feature $x_{CA}$ 550, which is a vector with a length equal to total number of composite actions of interest.

The method 300 then proceeds from step 305 to step 310.

At composite action unary determination step 310, the method 300 determines an initial estimate of the composite action classification state $y_{CA}$ 570 using a potential function $y_{CA}$ 560, which is a log-linear potential function modelling the interdependency between composite action feature representation $x_{CA}$ 550 and composite action classification state $y_{CA}$ 570. The composite action unary determination step 310 determines the output of a unary potential function $\phi_{CA}(y_{CA}, x_{CA}, w_{CA})$ 560, which is the dot-product of model parameters $w_{CA}$ 431 (see FIG. 4) and the estimate of composite action feature $x_{CA}$ 550 determined at step 305. That is, $\phi_{CA}(y_{CA}, x_{CA}, w_{CA}) = <x_{CA}, w_{CA}[y_{CA}]>$, where $w_{CA}[a]$ is the set of learned model parameters 431 associated with the output state a (and a refers to a composite action class denoted as $y_{CA}$ in the equation above). The learned model parameters 431 will be described hereinafter in relation to FIG. 4. Step 310 is an optional step of the method 300.

The method 300 proceeds from step 310 to step 320. However, if steps 305 and 310 are not performed, then the method 300 commences at step 320.

Action unit feature determination step 320 determines features $x^i_{AU}$ 510a to 510n (where i=1 to n) for each respective segment $S^i$ 590 (where i=1 to n). Similar to step 305 above, action unit features $x^i_{AU}$ 510 are determined by the feature extraction module 120 and the feature encoding of segments module 130. The features 510a to 510n are collectively referred to as the features 510 hereinafter, and, when referring to one of the features 510, the feature 510 is used.

In one embodiment, the feature extraction module 120 uses a sparse STIP feature extraction to generate the features 510 from the respective segments 590. The feature extraction module 120 then outputs HOG-HOF (histogram of oriented gradient-histogram of optical flow) descriptors for each segment 590. Alternatively, when sufficient computational resources are available, the feature extraction module 120 computes "dense trajectories" to generate the features 510 from the respective segments 590. The feature encoding of segments module 130 receives the HOG-HOF descriptors and uses Fisher vector encoding to pool features extracted from all the frames in each segment $S^i$ 5905. Fisher vectors encode both first and second order distance statistics between the HOG-HOF descriptors and a Gaussian Mixture Model (GMM). The GMM has been trained in an action unit feature learning module 445 (which will be described hereinafter with reference to FIG. 4) to a random sub-set of HOG-HOF descriptors from the training data set 410.

In one alternative embodiment of the feature encoding of segments module 130, the number of HOG-HOF descriptors assigned to each Gaussian component, say 64 components, is also recorded in the Fisher vectors. The feature encoding of segments module 130 first applies Principal Component Analysis (PCA) to reduce the dimension of each feature 510, say from 162 dimensions to 80 dimensions, and to decorrelate the data. Thus, when PCA is used, each Fisher vector has 2×80×64=10240 dimensions. Applying PCA before calculating Fisher vector encoding is an optional step.

In one alternative embodiment, a multi-class support vector machine (SVM) is used after the feature encoding of segments module 130. The SVM classifies the Fisher vector encodings to obtain a value for each feature 510, which is a vector with a length equal to the total number of action unit classes of interest.

The method 300 proceeds from step 320 to step 330.

Feature context determination step 330 determines an action unit context feature representation $x^i_{AUC}$ for each feature $x^i_{AU}$ 510 (where i=1 to n). The action unit context feature representation $x^i_{AUC}$ is a concatenation of the feature $x^i_{AU}$ 510 and a representation of the preceding features $x^0_{AU}$ to $x^{i-1}_{AU}$ called $PRE^i$, and a representation of the subsequent features $x^{i+1}_{AU}$ to $x^n_{AU}$ called $POST^i$. The preceding features $x^0_{AU}$ to $x^{i-1}_{AU}$ are represented by a feature representation $PRE^i$, while the subsequent features $x^{i+1}_{AU}$ to $x^n_{AU}$ are represented by a feature representation $POST^i$. Thus, the action unit context feature representation $x^i_{AUC}$ can be represented by the equation: $x^i_{AUC} = [PRE^i\ x^i_{AU}\ POST^i]$.

The concatenation of $PRE^i$, $x^i_{AU}$, and $POST^i$ to obtain $x^i_{AUC}$ can be done in any order, as long as the same concatenation order is used for all i=1 to n. For example, the concatenation order can be $[PRE^i\ x^i_{AU}\ POST^i]$, $[x^i_{AU}\ PRE^i\ POST^i]$, and the like, as long as the order is consistent for all $x^i_{AUC}$.

The length of the action unit context feature representation $x^i_{AUC}$ is determined by the length of the possible action units in $x^i_{AU}$ 510, $PRE^i$, and $POST^i$. If there are 3 possible action units (i.e., the length of each of $x^i_{AU}$ 510, $PRE^i$, and $POST^i$ is 3), then the length of $x^i_{AUC}$ is 9.

For example, for the feature 510c of the segment 590c, the action unit context feature representation $x^i_{AUC}$ comprises the feature 510c (generated from the segment 590c); the feature representation $PRE^i$ representing the features from previous segments 510a and 510b (generated from the respective segments 590a and 590); and the feature representation $POST^i$ representing the features from subsequent segments 510d to 510n (generated from the respective segments 590d to 590n).

In one embodiment, the feature representation $PRE^i$ represents the immediate previous neighbour feature $x^{i-1}_{AU}$ 510, while the feature representation $POST^i$ represents the immediate subsequent neighbour feature $x^{i+1}_{AU}$ 510. For example, for i=3, an action unit context feature representation $x^3_{AUC}$ comprises the feature representation $PRE^i$ representing $x^2_{AU}$ 510b and the feature representation $POST^i$ representing $x^4_{AU}$ 510d.

If a feature $x^i_{AU}$ 510 of a segment 590 has no predecessors or successors, the respective feature representation $PRE^i$ or $POST^i$ is given a default value. In an example of a case with 3 action units of interest, the default values are $PRE^1 = [0\ 0\ 0]$ and $POST^n = [0\ 0\ 0]$. The length of the zero vector is the same as the number of action units of interest.

In one embodiment, the composite action feature representation $x_{CA}$ 550 (determined at optional step 305) is added to the concatenation of $x^i_{AUC}$ such that: $x^i_{AUC}\ [PRE^i\ x^i_{AU}\ POST^i\ x_{CA}]$. Hence, the initial estimate of the composite action 550 contributes to the classification of the action units $y^i_{AU}$ 530.

In one embodiment, an initial object classification $x^i_{obj}$ (discussed in relation to FIGS. 6 and 7) is added to the concatenation of $x^i_{AUC}$ such that: $x^i_{AUC}\ [PRE^i\ x^i_{AU}\ POST^i\ x^i_{obj}]$. The initial object classification, e.g. "knife", relates to objects involved in the performing of action units of interest, e.g. "cutting an orange". Thus, the initial object classification $x^i_{obj}$ contributes to the classification of action units, which are expected to be related to the classified object.

The method 300 proceeds from step 330 to step 340.

Initial action unit label estimation step 340 determines an initial estimate of an action unit classification state $y^i_{AU}$ 530 using a potential function $\phi_{AU}$ 520, which is a log-linear potential function modelling the interdependency between the action unit context feature representation $x^i_{AUC}$ (determined at step 330) and the corresponding action unit classification state $y^i_{AU}$ 530 for each segment $S^i$ 590 (where i=1 to n).

The initial action unit label estimation step 340 (using model parameters $w_{AUC}$ 432 of learned parameter model w 430 described hereinafter in relation to FIG. 4) uses a unary potential function $\phi_{AU}(y^i_{AU}, x^i_{AUC}, w_{AUC})$ 520, which is the dot-product of the model parameters $w_{AUC}$ 432 and $x^i_{AUC}$. That is, $\phi_{AU}(y^i_{AU}, x^i_{AUC}, w_{AUC}[y^i_{AU}]) = \langle w_{AUC}[y^i_{AU}], x^i_{AUC} \rangle$, where $w_{AUC}[a]$ is the set of model parameters associated with action unit label a.

Therefore, for each segment $S^i$ 590, an initial estimate of an action unit label $y^i_{AU}$ is determined from a corresponding unary potential function $\phi_{AU}$, where the unary potential function $\phi_{AU}$ has as ordered input the plurality of features ($x^i_{AU}$ and $PRE^i$ and $POST^i$) from a current temporal segment $S^i$ 590 and at least one other of the temporal segments $S^0$ to $S^{i-1}$ 590 and $S^{i+1}$ to $S^n$ 590. The segments $S^0$ to $S^{i-1}$ 590 being temporal segments 590 before the current temporal segment $S^i$ 590.

The method 300 then proceeds from step 340 to step 350.

Inter-concept dependency modelling step 350 determines the composite action classification state $y_{CA}$ 570 by using a pair-wise potential function $\phi_{CA-AU}(y_{CA}, y^i_{AU}, w_{CA-AU})$ 540, which is implemented as a look-up table in the matrix of the action pair model parameters $w_{CA-AU}$ 433. That is, $\phi_{CA-AU}(y_{CA}, y^i_{AU}, w_{CA-AU}) = w_{CA-AU}[y_{CA}, y^i_{AU}]$ where $w_{CA-AU}[a,b]$ is the parameter associated with composite action label a, and action unit label b.

The method 300 then proceeds from step 350 to step 360.

Total potential function determination step 360 aggregates the log-linear potential functions ($\phi_{CA-AU}$, $\phi_{CA}$, $\phi^i_{AU}$) into a conditional random field (CRF) probability distribution $P^{CRF}$ for the video clip 580 with n segments 590. The CRF is used in composite action label estimation step 370 (described below) to jointly consider the input features ($x_{CA}, x_{AUC}^1, \ldots, x_{AUC}^n, y_{CA}, y_{AU}^1, \ldots, y_{AU}^n$) for classification of composite action classification state $y_{CA}$ 570. For a set of input features $X=(X_1, \ldots, X_n)$, the tree-structured contextual feature CRF $P^{CRF}$ 505 specifies a probability distribution over n action unit output variables $Y=(Y_1, \ldots, Y_n)$ as the exponential sum of the log-linear potential functions ($\phi_{CA-AU}$, $\phi_{CA}$, $\phi^i_{AU}$), normalised by partition function Z, as follows:

$$P^{CRF}(Y=y \mid X=x) = \frac{1}{Z(x)} \exp\phi(Y=y \mid X=x)$$

$$Z(x) = \sum_{y'} \exp\phi(Y=y' \mid X=x)$$

$$\exp\phi(Y=y \mid X=x) =$$
$$\exp\phi(y_{CA}, y_{AU}^1, \ldots, y_{AU}^n \mid x_{CA}, x_{AUC}^1, \ldots, x_{AUC}^n) =$$
$$\exp\left(\phi_{CA}(y_{Ca}, x_{CA}, w_{CA}) + \sum_{i=1\ldots n}(\phi_{CA-AU}(y_{CA}, y_{AU}^i, w_{CA-AU}) + \phi_{AU}(y_{AU}^i, x_{AUC}^i, w_{AU}))\right)$$

Substituting the potential functions with the equations provided in steps 310, 340, and 350 provides:

$$\exp\phi(Y=y \mid X=x) =$$
$$\exp\left(\langle x_{CA}, w_{CA}[y_{CA}]\rangle + \sum_{i=1\ldots n}(w_{CA-AU}[y_{CA}, y_{AU}^i] + \langle x_{AUC}^i, w_{AU}[y_{AU}^i]\rangle)\right)$$

Where:

Y is the set of n+1 output variables in the domain of $\phi$: $Y=\{Y_{CA}, Y^1_{AU}, \ldots, Y^n_{AU}\}$. y is a value of Y: $y=\{y_{CA}, y^1_{AU}, \ldots, y^n_{AU}\}$.

X is the set of n+1 input variables used in the domain of $\phi$: $Y=\{X_{CA}, X^1_{AUC}, \ldots, X^n_{AUC}\}$. x is a value of X: $x=\{x_{CA}, x^1_{AUC}, \ldots, x^n_{AUC}\}$.

Partition function Z(x) is a normalisation factor which is the summation over all possible values for Y, given the value of input features X=x. y' is a possible value for Y. $P^{CRF}(Y=y \mid X=x)$ is the probability of Y having assignment y, given an assignment X=x of input variables.

In one embodiment, when the composite action unary determination step 310 is not performed, and no initial estimate for $y_{CA}$ 570 is determined:

$$\exp\phi(Y=y \mid X=x) = \exp\left(\sum_{i=1\ldots n}(w_{CA-AU}[y_{CA}, y_{AU}^i] + \langle x_{AUC}^i, w_{AU}[y_{AU}^i]\rangle)\right)$$

While not generating an initial estimate of the composite action unit label would reduce the computation cost, it may also result in a small reduction in the classification accuracy.

The learned parameter model w 430 (comprising $w_{CA}$ 431, $w_{CA-AU}$ 433, $w_{AUC}$ 432) of the contextual feature CRF $P^{CRF}$ 505 are learned off-line from a training set 410 having training samples of the form $(x, y)=(x_{CA}, x_{AUC}^1, \ldots, x_{AUC}^n, y_{CA}, y_{AU}^1, \ldots, y_{AU}^n)$. The training set 410 and the learned parameter model w 430 will be described below in relation to FIG. 4. Features $x_{CA}$ and $x_{AUC}^1, \ldots, x_{AUC}^n$ are extracted, as described in the composite action unary determination step 305 and the feature context determination step 330, from each of the video clips $C_j$ 411 in the training set (where index j is an identifier for the different clips in the training set) in the same fashion as steps 305 and 330 above. In one embodiment, the parameters w are learned by maximising the log of the likelihood of training labels 413 from the training data set 410. In another embodiment, the parameters w of the contextual feature CRF $P^{CRF}$ 505 are learned by maximising the margin between the correct class 413 and other classes, as described in relation to FIG. 4.

In one embodiment, the learning from a training set 410 is done once for many different system deployments. In another embodiment, the training set 410 is generated for a specific system deployment, using video clips 411 acquired at the site where the system is to be deployed.

The method 300 then proceeds from step 360 to step 370.

Composite action label estimation step 370 determines a composite action label $y_{CA}$ (570) for video clip 580 by jointly optimising the initial estimate of the action unit labels $y^1_{AU}$ to $y^n_{AU}$ (530) corresponding to the segments $S_1$ to $S_n$ 590 of the video clip 580 and initial estimate of the complex action unit label $y_{CA}$ 570 corresponding to the video clip 580, using the contextual feature CRF $P^{CRF}$ 505 determined in total potential function determination step 360.

For a given set of features $x=(x_{CA}, x_{AUC}^1, \ldots, x_{AUC}^n)$ and model parameters w 430, joint inferencing of the class of the composite action as well as the classes of the constituent action units finds the $y=(y_{CA}, y_{AU}^1, y_{AU}^2, \ldots, y_{AU}^n)$, which maximises $P^{CRF}$ 505. In one arrangement, the composite action label estimation step 370 calculates a maximum a posteriori (MAP) solution of the CRF model.

In one example, the MAP solution may be found using a belief propagation algorithm. Other examples may use other MAP inferencing algorithms, such as '$\alpha$-$\beta$ swap' which is an extension of the so called 'graph-cut' algorithm to multi-state MRF.

The tree structure of the contextual CRF enables the MAP inference algorithm to, find the optimal value of each action unit output variable $y^i_{AU}$ 530, conditioned on the state of the composite action $y_{CA}$ 570, independent of the other action unit output variables $y^i_{AU}$ 530 (where j is not equal to i), by modelling the pair-wise inter-concept dependencies. Tree-structured CRFs have efficient inference algorithms, and therefore have computational advantage over more densely connected CRFs with loops.

After calculating the MAP solution, and thereby determining the composite action label and the action unit labels, the method 300 to perform joint action classification ends.

The final estimates of the composite action $y_{CA}$ 570 and the action units $y^1_{AU}, \ldots, y^n_{AU}$ 530 are used for application-specific purposes. For example, a report is generated which reports for a video clip 580 that its contents relate to a composite action $y_{CA}$ 570 and that the ordered constituent action units in $y_{CA}$ 570 are $y^1_{AU}, \ldots, y^n_{AU}$ 530. In practice, numerical identifiers, e.g. 42, are used as labels, and for reporting purposes the numerical identifiers are converted to textual descriptions (e.g. "walk") by doing a look-up in a table mapping numerical identifiers to textual descriptions. In another example, the final estimate of $y_{CA}$ 570 is used to perform a lookup of permissible sequences of action units. For example, if $y_{CA}$="A" and the permissible action unit sequences for "A" are {1,2,3} and {2,1,3}, an alert is be triggered if $y^1_{AU}$=2, $y^2_{AU}$=3, $y^3_{AU}$=1, because the sequence of actions is considered unsafe. However, no alert is triggered if $y^1_{AU}$=1, $y^2_{AU}$=2, $y^3_{AU}$=3.

In one arrangement, for ease of implementation, a task parallel approach is followed. For example, the action unit feature determination step 320 is completed prior to the initial action unit label estimation step 340, and the segment selection step 330 processes the segments 590 in an arbitrary order. According to the present arrangement the segments may be processed in parallel in the determination step 320.

In another arrangement, a data parallel approach is followed if such an approach is beneficial for the hardware architecture used. In one example, the feature determination step 320 and the initial action unit label estimation step 340 are performed for a segment 590, in temporal order of the segments 590. The feature determination is completed for at least a number of segments, say 3, prior to segment selection step 330, so that the initial action unit label estimation step 340 has sufficient input. As a result a window of adjacently located segments may be processed in parallel by the feature determination step 320 and the output of the window is then processed in the segment selection step 330 and the initial action unit label estimation step 340.

[Segmentation of the Video Clip 580]

As described hereinbefore, a video clip 580 includes multiple segments 590. A temporal boundary of a segment 590 is detected when there is a change in a frame of the video clip 580. For example, a new segment 590 is created when a face (e.g., the cook returns from fetching a utensil) appear at frame t of the video clip 580, when in frames prior to t no face was visible. In another example, a new segment 590 is created when a face disappears (e.g., the cook has turned around to find an ingredient) in frames t, when that face was visible in the frames prior to t. In another example, the segmentation of the video clip 580 is done with a graphical user interface to acquire the segmentation temporal boundaries from a human annotator.

In another example of the segmentation of the video clip 580, a sliding window approach is used for temporal segmentation of clip C 580 into action unit segments S, 590, also known as localisation of action units. A predetermined list of expected action units, or action units of interest, is provided, for example "slice bread", "walk", "push elevator button". Any action not on the predetermined list is not considered an action unit of interest. A classifier is trained for the action units of interest, using a training set 410 containing segmented instances 412 of the action units of interest (shown in FIG. 4). The trained classifier is then applied to a set of fixed size and overlapping temporal segments of a video clip 580 with a composite action. The size of the segments, say 100 frames, and the ratio of overlap, say 25%, are predetermined. The segments 590 containing the action unit of interest are then identified using a local maxima search with a predetermined threshold, say 0.5. The sliding window search needs to be repeated for each action unit of interest.

[Action Unit Feature Determination Step 320]

In one example embodiment of the feature determination step 320, the features are semantic features. Semantic features are observed variables that are easy to understand by humans, and have a direct correspondence to linguistic concepts. In one example of the use of semantic features, the feature is a vector of scores, where each score is from an independent classifier that was trained to recognise a semantic concept. In one arrangement, the semantic features are of the same type as the target semantic concepts, as included in the target output label states. That is, an example of a segment semantic feature is "crack egg", while there is an action unit output label that is also "crack egg". Because of the direct correspondence between features and output labels, the features are likely to contribute to successful classification. However, such semantic features are not always available. Therefore, in another arrangement, a segment semantic feature is used as an input only, e.g. the object "knife", and does not directly correspond to a target concept. Such input-only semantic features may have been implemented for general purposes and are re-used for the specific application, or are the input-only semantic features may have been more feasible to create than semantic features corresponding directly to output labels. In yet another arrangement, a mix of these semantic features is used, such that the output states correspond to a subset of the input semantic features.

In another example embodiment of the action feature determination step 320, the features are low-level features. Low-level features are observed variables that are usually not easy to understand by humans, and do not directly map to linguistic concepts. However, these low-level features are generally computationally cheaper to extract than semantic features. In addition, compared to semantic features, low-level features are more likely to apply to a large range of applications without specification of the nature of the applications. In one arrangement, the low-level features are calculated using a representation of other low-level features (these features are even lower-level, i.e. closer to the raw sensor data). For example, the representation is a bag-of-words (BoW) representation, or a vector of locally aggregated descriptors (VLAD) encoding, or a Fisher vector (FV) encoding. For example, designed lower-level features are STIP, or dense trajectories, or motion boundary video descriptors, or improved dense trajectories, or histogram of oriented gradient (HoG), or scale invariant feature transformation (SIFT), or colour histograms. In yet another arrangement, features are learned using a data-driven approach, such as deep learning, e.g. using a convolutional neural network (CNN). The advantage of a data-driven approach is that features are automatically tailored to the specific problem domain, unlike the designed features which are intended to apply to a large problem domain. A disadvantage of a data-driven approach is that a large and diverse data set, representative for the specific problem domain, is needed to train the features, and that training is computationally intensive. The designed features do not have such overhead and can be used instantly. In yet another arrangement, a mix of these low-level features is used.

[Selection of Context Segments in Feature Context Determination Step 330]

There are alternative embodiments for the feature context determination step 330. In one embodiment, the feature representation $PRE^i$ represents the immediate previous neighbour feature $x^{i-1}_{AU}$ 510, while the feature representation $POST^i$ does not represent any neighbouring feature, i.e. $POST^i=[0\ 0\ 0]$.

In another embodiment, the feature representation $POST^i$ represents a temporally later segment $S^{i+j}$ 590, such that $POST^i=x^{i+j}_{AU}$ 510, where j>1. In one example, the selection of the temporally later segment $S^{i+j}$ 590 is based on a relationship between the actions in $S^i$ 590b and the actions in $S^{i+j}$ 590, which is observed by the system designer or domain expert. For example, the observation is that actions alternate between related and unrelated actions, such as "retrieve salt" "walk" "add salt to dish" "walk" "retrieve pepper" "walk". In this example, j=2 would provide better correlation between the action units as only related action units of "retrieve salt", "add salt to dish", and "retrieve pepper" are retrieved. In another example, j is determined dynamically to correspond to the first segment $S^{i+j}$ 590 after segment $S^i$ 592 which has an action unit feature representation $x^{i+j}_{AU}$ 510 indicating that the action unit is an action unit of interest, i.e. the action unit is not idle or an action unit not of interest. If no such segment $S^{i+j}$ 590 is found, $POST^i=[0\ 0\ 0]$.

In another embodiment for the feature context determination step 330, $PRE^i$ and $POST^i$ are computed using a pooling approach over multiple segments 590. In one example, feature representations corresponding to all segments 590 preceding segment $S^i$ 590b are max-pooled so that each vector row value in $PRE^i$ is the highest value of the values in the corresponding vector row values in $x^1_{AU}$ to $x^{i-1}_{AU}$. For example, for i=4, for $x^1$=[0.2 0.4 0.6], $x^2$=[0.7 0.9 0.6], and $x^3$=[0.8 0.1 0.6], the result of the feature representation PRE for $x^1_{AU}$ to $x^{i-1}_{AU}$ is $PRE^4$=[0.8 0.9 0.6]. In another example, a predetermined window, say 5 segments, of segments 590 prior to $S^i$ 590b are used for max-pooling in a similar way, i.e. the pooling is done over $x^{i-5}_{AU}$ to $x^{i-1}_{AU}$. In one embodiment, $POST^i$ is computed in a similar way to $PRE^i$, using subsequent segments 590 to $S^i$ 590b instead of preceding segments 590, i.e. pooling over $x^{i+1}_{AU}$ 510c to $x^n_{AU}$ 510.

Those skilled in the art understand that the embodiments for the feature context determination step 330 may be combined in a variety of ways. For example, $PRE^i$=0 and $POST^i=x^{i+1}_{AU}$ 510c, $PRE^i$=maxpool and $POST^i=x^{i+j}_{AU}$ 510, and the like.

[Parameter Learning]

Figure 4:
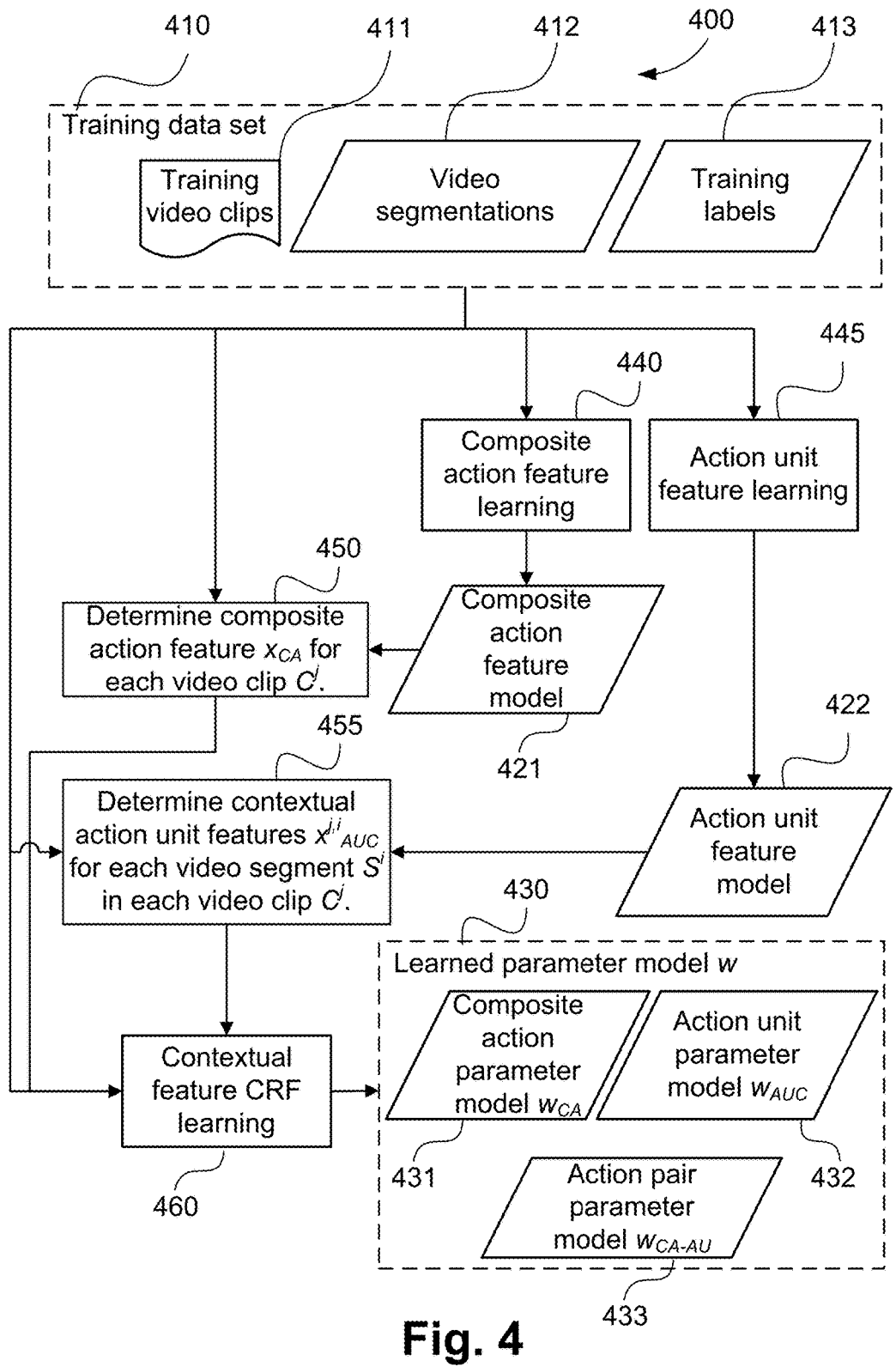
FIG. 4 is a schematic dataflow diagram illustrating a method of learning the parameters of the joint action classification of FIG. 3 according to one embodiment of the invention.

FIG. 4 describes the dataflow of a parameter learning system to train the model parameters $w_{CA-AU}$ 433, $w_{CA}$ 431, and $w_{AUC}$ of the respective potential functions $\phi_{CA-AU}$ 540, $\phi_{CA}$ 560, and $\phi^i_{AU}$ 520. The training data set 410 comprises training video clips 411, video segments 412 corresponding to segments in the training video clips 411, and training labels 413.

The video clips 411 are representative for the video data set to which the joint action classification method 300 is to be applied. The training labels 413 represent the correct class labels for the composite action in each video clip 411 and for action units in the video segments 412.

The training data set 410 is used in a composite action feature learning module 440 to create a composite action feature model 421. Similarly, the training data set 410 is used in an action unit feature learning module 445 to create an action unit feature model 422. The feature models 421 are used in the composite action feature determination step 305 and the action unit feature models 422 are used in the action unit determination step 320.

The feature model 421 is then used by a composite action feature determination module 450 (similar to the composite action feature determination step 305) to create a composite action feature $x_{CA}$ 550. The feature model 422 is used by a contextual action unit feature determination module 455 (similar to the outcome of the concatenation produced by the execution of steps 320, 330, and 340) to create a contextual action unit feature $x^i_{AUC}$. The composite action feature $x_{CA}$ 550 and the contextual action unit feature $x^i_{AUC}$ are used in contextual feature CRF learning module 460, along with training labels 413, to create a learned parameter model w 430 (specifically: composite action parameter model $w_{CA}$ 431, action pair parameter model $w_{CA-AU}$ 433, and action unit parameter model $w_{AUC}$ 432).

An example of learning the model parameters w 430 of the contextual feature CRF 505, as done in contextual feature CRF learning module 460, may use a parameter optimisation technique to follow a maximum-margin learning method. In a maximum-margin learning method, a cost function C(w) for a training sample (y, x) may be defined as $$C(w; x, y) = \max_{\tilde{y}} \Phi(\tilde{y}, x, w) - \Phi(y, x, w) + \Delta(\tilde{y}, y)$$

where $\Delta(\tilde{y}, y)$ is a hamming loss calculated on a vector of score values from a solution to the model $\tilde{y}$, and a vector of ground truth labels y. For a given training set $\{(y^k, x^k)\}_{k=1}^m$, the model parameters w 430 may be found by solving the following optimisation problem $$\min_w \frac{1}{2}\lambda\|w\|_2^2 + \sum_{k=1}^m C(w, x^k, y^k)$$

using an optimisation technique such as block-coordinate Frank-Wolfe optimisation.

[Object Recognition]

Many action units include an object involved in that action unit, e.g. "egg" in "crack egg". In some cases, object information related to the action unit is essential to distinguish between different action unit classes, e.g. "pour milk" and "pour tea" which have similar motions (namely, tilting an object so that liquid comes out) but which are performed with different objects (namely, a milk carton or a tea pot). In one embodiment, recognition scores are generated for object types expected to be useful for improving the pre-classification of the action units and composite actions in the feature determination steps 305 and 320. In one embodiment, the object recognition scores are generated using a trained deformable part model (DPM). To reduce the computation cost of generating object recognition scores, the trained DPMs are applied to a sub-set of video frames, e.g. every third or sixtieth frame, and the scores are pooled per action unit segments 590 using a per-class max-pooling approach. In a similar fashion, the object recognition scores are pooled over the whole video clip 580 using the same per-class max-pooling approach.

In one embodiment, the object recognition scores are normalised using a logistic function $$f(x) = \frac{1}{1+e^{-2x}},$$

where x is the output of the DPM for each object class.

In an example, an object, e.g. a knife, is captured by a camera in video clip 580 in a scene, e.g. a kitchen. The object is captured in a contextual first portion of video clip 580, e.g. from frame 100 to frame 200, and is not yet involved in any actions of interest in the first portion. For example, the knife is transported from the kitchen drawer to the kitchen bench (an action that is not of interest), or the knife is lying on the kitchen bench. In a target second portion of video clip 580, which is disjoint (non-overlapping) from the first portion, e.g. from frame 201 to frame 300, the object is used to perform an action unit of interest, e.g. the knife for "cutting an orange". However, in the second portion of video clip 580, the object is not necessarily observable, e.g. due to occlusion by the cook and the camera viewpoint.

Figure 6:
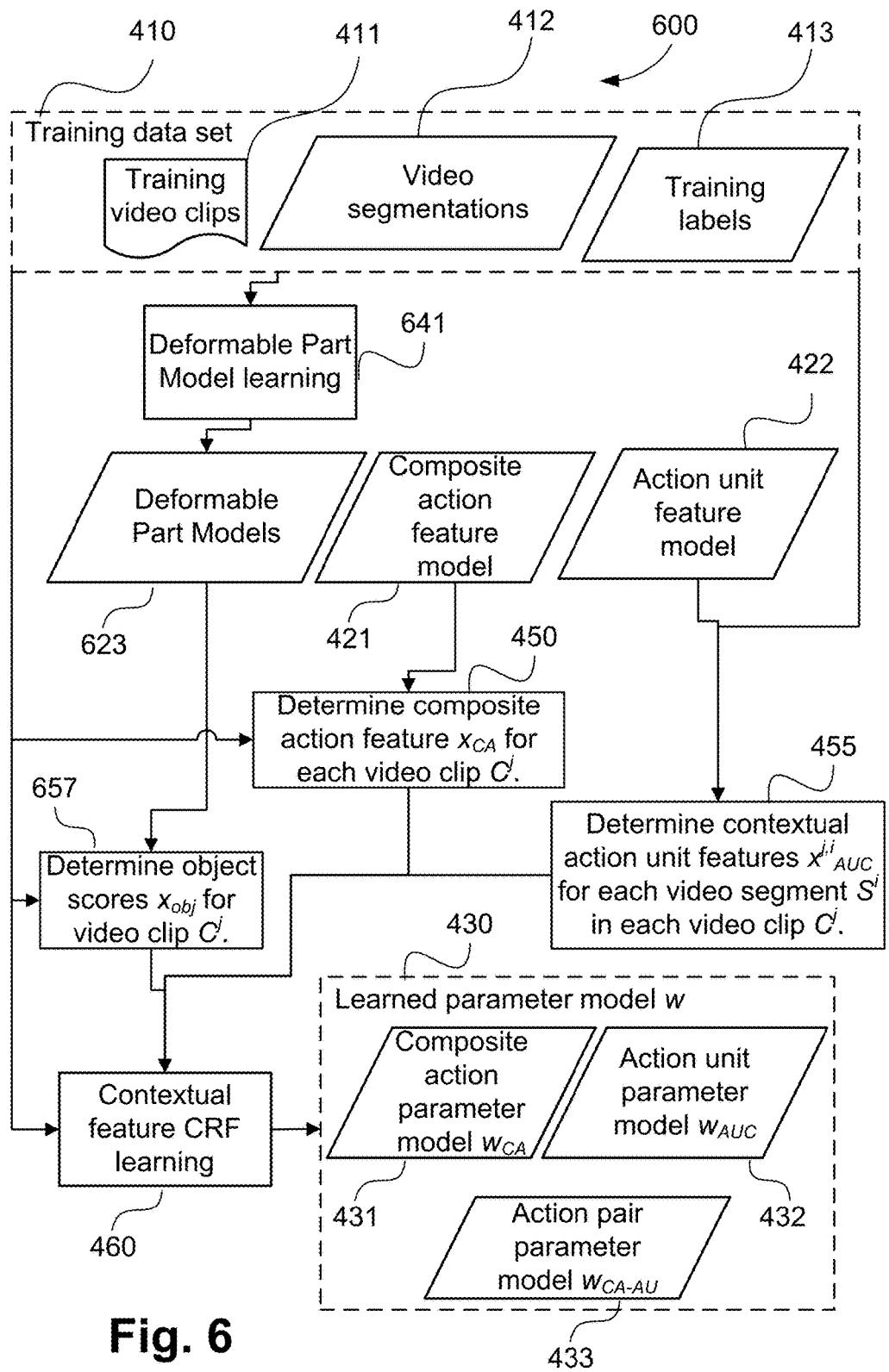
FIG. 6 is a schematic dataflow diagram illustrating a method of learning the parameters of the joint action classification of FIG. 3 with an object classification module.

FIG. 6 shows the method of learning model parameters as described above in relation to FIG. 4. However, the method of FIG. 4 has been extended to incorporate the contribution of object recognition. In particular, deformable part learning module 641, deformable part object models 623, and object features determination module 657 are added into the learning model parameters of FIG. 4. For simplicity, some details from FIG. 4 (specifically the composite action feature learning module 440 and the action unit feature learning module 445) have been omitted.

Figure 7:
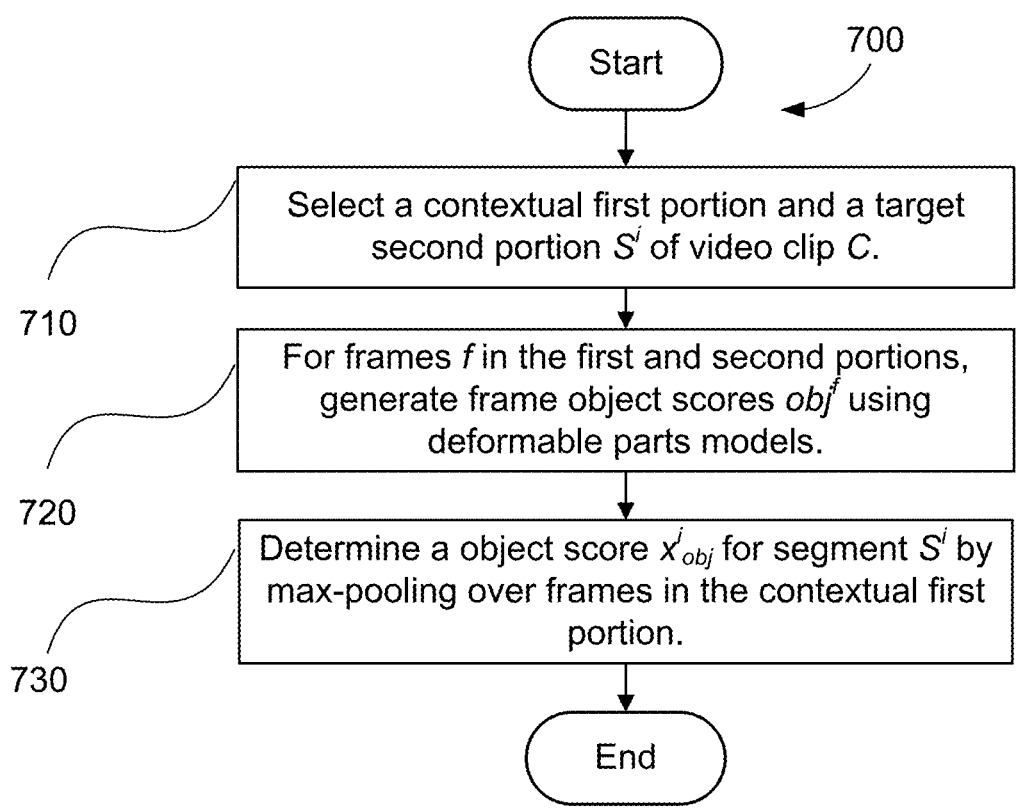
FIG. 7 is a schematic flow diagram illustrating a method of generating an initial object classification for the object classification module of FIG. 6.

FIG. 7 is a schematic flow diagram of a method 700 to perform initial object classification, where the observation and subsequent object classification in the contextual first portion of video clip 580 is used to inform the action unit classification in the target second portion of video clip 580. In one embodiment, in the first portion of video clip C 580, the object is classified as a contextual object. The portion selection step 710 selects the contextual first portion and target second portion. In one embodiment, the first contextual portion of video clip 580 is the segment $S^{i-1}$ 590a, preceding the second target portion segment $S^i$ 590b on which the action unit classification is to be performed. Based on a list of objects of interest, e.g. {"knife", "egg", "orange" }, DPM object models 623 are created by the deformable part model learning module 641 for each of the objects of interest using a training set 410 with frame-based bounding box object labels 413. At recall time, in the frame object score generating step 720, video clip 580 is processed to generate DPM-based object scores (from $-\infty$ to $\infty$) for frames in the segments 590 from the deformable parts models 623, resulting in bounding boxes corresponding to the location of the object as well as a score corresponding to the confidence that the object is found in the bounding box. For every DPM object model in the deformable parts models 623 and a frame, the object score determination step 730 selects the corresponding highest score, so that for each frame f there is a frame object score vector obj$^f$ with a size corresponding to the number of object classes (3 in the example). The actual bounding box location is not preserved, as only the confidence of the object appearing in the frame and in the video is used.

An object score $x_{obj}{}^i$ for each segment $S^i$ 590 is determined by max-pooling the frame object score vectors of all processed frames in the segment $S^i$ 590 itself for each object class k: $x_{obj}{}^i[k] = \max_{f \in s^i} obj^f[k]$, where the in operator relates to frames f that are included in the temporal range covered by the segments ($S^i$ in this example). However, there is an occlusion issue, where the object is likely to be occluded when it is involved in an action. That is, for the segment where the object class is most informative about the segment's action unit classification, the object is less likely to be observed.

To address the occlusion issue, in one embodiment, the object score $x_{obj}{}^i$ for each segment $S^i$ 590 is determined by max-pooling the frame object score vectors of all processed frames in preceding segment $S^{i-1}$ 590 for each object class k:

$x_{obj}{}^i[k] = PRE_{obj}{}^i[k] = \max_{f \in s^{i-1}} obj^f[k]$, where the in operator relates to frames f that are included in the temporal range covered by the segments ($S^{i-1}$ in this example). The max-pooled object score vector $x_{obj}{}^i$ has the same size as a frame object score vector. In one embodiment, the first portion of the video comprises all segments prior to $S^i$ 590 (i.e., $S^1, \ldots, S^{i-1}$), and frames are selected and max-pooled as described above: $x_{obj}{}^i[k] = PRE_{obj}{}^i[k] = \max_{f \in \{S_1, \ldots, S_{i-1}\}} obj^f[k]$, as determined by the object features determination module 657.

In another embodiment, the first portion of the video comprises all segments 590 after $S^i$ 590 (i.e., $S^{i+1}, \ldots, S^n$): $x_{obj}{}^i[k] = POST_{obj}{}^i[k] = \max_{f \in \{S_{i+1}, \ldots, S_n\}} obj^f[k]$. In another embodiment, the first portion of the video comprises all segments 590 in clip 580 except $S^i$ 590 (i.e., $S^1, \ldots, S^{i-1}, S^{i+1}, \ldots, S^n$): $x_{obj}{}^i[k] = \max_{f \in \{S_1, \ldots, S_{i-1}, S_{i+1}, \ldots, S_n\}} obj^f[k]$. In another embodiment, the first portion of the video clip 580 is represented by two observed variables: one observed variable $PRE^i{}_{obj}$ corresponds to segments prior to $S^i$ 590 (i.e., $S^1, \ldots, S^{i-1}$), and one observed variable $POST^i{}_{obj}$ corresponds to segments after $S_i$ 590 (i.e., $S^{i+1}, \ldots, S^n$). Combining initial action unit classifications and object classifications, this leads to action unit context feature representation $x^i{}_{AUC}$ being computed as follows: $x^i{}_{AUC} = [PRE^i x^i{}_{AU} POST^i PRE^i{}_{obj} x^i{}_{obj} POST^i{}_{obj}]$. In further variants on the above embodiments, the range frames considered before and after segment $S^i$ 590 are bounded by predetermined thresholds, say 1000 frames or 3 segments.

In one embodiment, the object scores $x^i{}_{obj}$ are used directly as feature values. In another embodiment, an initial object estimate $\hat{x}_{obj}{}^i$ for segment $S_i$ 590 is determined by classifying which of the objects classes are expected to be present in the video frames:

$$\hat{x}^i_{obj}[k] = \begin{cases} \text{if } x^i_{obj} \geq \tau: x^i_{obj} \\ \text{if } x^i_{obj} < \tau: -\infty \end{cases}$$

where $\tau$ is a predetermined threshold, say $-0.8$. In another embodiment, the values are binarised:

$$\hat{x}^i_{obj}[k] = \begin{cases} \text{if } x^i_{obj} \geq \tau: 1 \\ \text{if } x^i_{obj} < \tau: 0 \end{cases}.$$

At training time, the contextual feature CRF learning module 460 operates as described before, but using one or more of the additional observed variables $PRE^i{}_{obj}$, $x^i{}_{obj}$, $POST^i{}_{obj}$ or $\hat{x}_{obj}{}^i$.

When frames are sampled for computational efficiency, it is possible that a short segment S, 590 is not covered. In that case, the segment $S_a$ is represented by the object score of the frame closest in time to the segment $S_a$.

In the second portion of video clip 580, the action unit of interest (performed with the object) is classified based on the classification of the contextual object from the first portion. In one embodiment, the initial object classifications are added to the concatenation $x^i_{AUC}$: $x^i_{AUC}$=[PRE$^i$ $x^i_{AU}$ POST$^i$ PRE$^i_{obj}$ $x^i_{obj}$ POST$^i_{obj}$], as described in step 330. Further processing is as described hereinbefore, with the understanding that training of the action unit parameter model 432 in the contextual feature CRF learning module 460 is done using the same concatenation. In one embodiment, the initial object classification for segment $S_i$ 590 is skipped, as it is often occluded anyhow such that: $x^i_{AUC}$=[PRE$^i$ $x^i_{AU}$ POST$^i$ PRE$^i_{obj}$ POST$^i_{obj}$]. In one embodiment, enabling a causal processing sequence, only object classification prior to segment $S^i$ 590 is considered: $x^i_{AUC}$=[PRE$^i$ $x^i_{AU}$ POST$^i$ $x^{i-1}_{obj}$]. Although the concatenations may be done in any order, the ordered input needs to be consistent with the ordered input used during training.

In addition to object classification for action units, object classification can be done in a similar fashion for the whole clip 580. The frame-level scores are max-pooled per class over the whole clip 580: $x^C_{obj}[k]=\max_{f \in \{S^1, \ldots, S^n\}} \text{obj}^f[k]$. In one embodiment, video clip object score $x^C_{obj}$ is used in the composite action unary determination step 310. The unary potential function is then extended to $\phi_{CA}(y_{CA}, x_{CA}, x^C_{obj}, w_{CA})$ 560 as the dot-product of the model parameters $w_{CA}$ 431 and the concatenated vector $[x_{CA}\ x^C_{obj}]$. I.e., $\phi_{CA}(y_{CA}, x_{CA}, x^C_{obj}, w_{CA})=<[x_{CA}, x^C_{obj}], w_{CA}[y_{CA}]>$. $w_{CA}[a]$ is the set of learned model parameters 431 associated with the output state a which is trained in the contextual feature CRF learning module 460 using a concatenated vector $[x_{CA}\ x^C_{obj}]$.

Example(s)/User Case(s)

Action classification of both composite actions and constituent action units has a variety of applications. In one example, for health and safety reasons, actions of staff in a warehouse are observed through a video surveillance system. When the composite action is classified as described elsewhere, the company procedure for performing the action is looked up in a procedures database. The constituent action units are then compared to the company procedure for the composite action. If there is a deviation between the procedure and the actual action, an alert is generated to the supervisor, e.g. as an SMS to the supervisor's mobile phone, or a report is generated for daily compliance review. In another example, a manufacturer of cooking ingredients observes the kitchen of surveyed families for a limited time period, say 2 weeks, for the purpose of determining authentic recipes of local cuisine, which are then distributed world-wide with the manufacturers products. An archive of videoed footage, e.g. from camcorders, is then processed with the action classification described elsewhere. Clips 580 with the same composite action 570 are grouped, and the constituent action units 530 are separated into mandatory recipe steps if they appear regularly, e.g. in 90% of the clips, and optional steps otherwise. The order of the mandatory steps is then determined based on the sequence of action units with the highest frequency in the archive.

The applications require an accurate classification of composite actions and constituent action units in videos where the time scales of the actions vary (e.g. one person takes 5 seconds to position a forklift truck, while another person takes half a minute) and where the composition of actions vary (e.g. one person first adds pepper and then salt, while another person adds salt prior to pepper). A tree structured CRF 505 with unary potential function 520 using action unit features of other segments 590 as context feature provides higher accuracy than a baseline CRF not using context features, while being computationally efficient. An experiment on a specific data set with food preparation videos shows an accuracy increase of more than 20 percentage points for action unit classifications 530 and more than 8 percentage points increase for composite action classifications 570. The online inferencing is computationally efficient (lower than a millisecond in the experiment), and suitable for real-time processing.

The invention claimed is:

1. A method of determining a classification of a composite action including a plurality of action units in a video clip, the method comprising:
   extracting a plurality of features from the video clip;
   determining a corresponding feature in the plurality of features for each of temporal segments of the video clip;
   determining an initial estimate of an action unit for each of the temporal segments using a potential function for each segment modeling dependency between a concatenation of features and a classification of a corresponding action unit by inputting a feature from a current temporal segment and a feature from at least one of preceding temporal segments or subsequent temporal segments as the concatenation of features;
   aggregating the potential functions into a probability distribution; and
   determining the classification of the composite action using the probability distribution by jointly inferring the classification of the composite action and classifications of the action units of the temporal segments based on the initial estimate of each action unit for each of the temporal segments.

2. The method according to claim 1, wherein the plurality of features are semantic features.

3. The method according to claim 1, wherein the plurality of features are low level features.

4. The method according to claim 1, further comprising:
   classifying at least one contextual object in at least one other of the temporal segments preceding the current segment,
   the at least one contextual object being independent of any action units of interest in the at least one other of the temporal segments preceding the current segment; and
   determining an action unit of interest in the current segment of the video clip, the action unit of interest being performed with the classified at least one contextual object and the determination of the action unit of interest in the current segment being based on the classification of the at least one contextual object wherein the current segment and the other segment preceding the current segment are disjoint.

5. The method according to claim 1, wherein the probability distribution is a conditional random field (CRF) probability distribution.

6. The method according to claim 5, wherein the CRF has a tree structure.

7. The method according to claim 5, wherein the CRF is in log-linear form.

8. A non-transitory computer readable medium having a computer program recorded on the computer readable medium, the computer program being executable by a computer system to perform a method of determining a classification of a composite action including a plurality of action units in a video clip, the method comprising:

extracting a plurality of features from the video clip;

determining a corresponding feature in the plurality of features for each of temporal segments of the video clip;

determining an initial estimate of an action unit for each of the temporal segments using a potential function for each segment modeling dependency between a concatenation of features and a classification of a corresponding action unit by inputting a feature from a current temporal segment and a feature from at least one of preceding temporal segments or subsequent temporal segments as the concatenation of features;

aggregating the potential functions into a probability distribution; and determining the classification of the composite action using the probability distribution by jointly inferring the classification of the composite action and classifications of the action units of the temporal segments based on the initial estimate of each action unit for each of the temporal segments.

9. A computer system, comprising:

a processor;

a memory having a computer program recorded thereon, the memory being in communication with the processor;

the processor executing the computer program to perform a method of determining a classification of a composite action including a plurality of action units in a video clip, the method comprising:

extracting a plurality of features from the video clip;

determining a corresponding feature in the plurality of features for each of temporal segments of the video dip;

determining an initial estimate of an action unit for each of the temporal segments using a potential function for each segment modeling dependency between a concatenation of features and a classification of a corresponding action unit by inputting a feature from a current temporal segment and a feature from at least one of preceding temporal segments or subsequent temporal segments as the concatenation of features;

aggregating the potential functions into a probability distribution; and determining the classification of the composite action using the probability distribution by jointly inferring the classification of the composite action and classifications of the action units of the temporal segments based on the initial estimate of each action unit for each of the temporal segments.

* * * * *